US007437756B2

(12) United States Patent
Bleumer

(10) Patent No.: US 7,437,756 B2
(45) Date of Patent: Oct. 14, 2008

(54) METHOD FOR SECURELY EXCHANGING DATA

(75) Inventor: Gerrit Bleumer, Schildow (DE)

(73) Assignee: Francotyp-Postalia AG & Co. KG (DE)

( * ) Notice: Subject to any disclaimer, the term of this patent is extended or adjusted under 35 U.S.C. 154(b) by 793 days.

(21) Appl. No.: 10/794,754

(22) Filed: Mar. 5, 2004

(65) Prior Publication Data

US 2004/0230798 A1 Nov. 18, 2004

(30) Foreign Application Priority Data

Mar. 5, 2003 (DE) ................................ 103 09 817

(51) Int. Cl.
*G06F 17/30* (2006.01)

(52) U.S. Cl. .................................. 726/6; 726/4; 726/17

(58) Field of Classification Search ..................... 726/3, 726/4, 11, 6, 17
See application file for complete search history.

(56) References Cited

U.S. PATENT DOCUMENTS 5,448,641 A 9/1995 Pintsov et al.

FOREIGN PATENT DOCUMENTS

EP 0 647 925 4/1995
EP 0 782 111 7/1997
EP 0 854 630 7/1998
EP 0 969 420 6/1999

OTHER PUBLICATIONS

Formal methods applied to secure network engineering Shin-Kai Chin; Faust, J.; Giordano, J.; Engineering of Complex Computer Systems, 1996. Proceedings., Second IEEE International Conference on Oct. 21-25, 1996 pp. 344-351.*

Leap-frog packet linking and diverse key distributions for improved integrity in network broadcasts Goodrich, M.T.; Security and Privacy, 2005 IEEE Symposium on May 8-11, 2005 pp. 196-207.*

Authentication and integrity in telecommunication signaling network; Sengar H.; Wijesekera, D.; Jajodia, S.; Engineering of Computer-Based Systems, 2005. ECBS '05. 12th IEEE International Conference and Workshops on the April 4-7, 2005 pp. 163-170.*

"Applied Cryptography," Schneier, pp. 28-29, 178-180, 513-522 and 577-582.

* cited by examiner

*Primary Examiner*—David Y Jung
(74) *Attorney, Agent, or Firm*—Schiff Hardin LLP

(57) ABSTRACT

In a method and arrangement for securely exchanging data between a first data processing unit and a second data processing unit, a secure communication channel is established between the first data processing unit and the second data processing unit in a communication configuration step, and a first message is transmitted from the second data processing unit to the first data processing unit via the secure communication channel in a data transmission step. During the data transmission step, the second data processing unit generates a second message by appending a predetermined annex to the first message and a third message by encrypting the second message using a secret key that is available only in the first data processing unit and in the second data processing unit and then transmits the third message to the first data processing unit.

27 Claims, 4 Drawing Sheets

METHOD FOR SECURELY EXCHANGING DATA

BACKGROUND OF THE INVENTION

1. Field of the Invention

The present invention pertains to a method for securely exchanging data between a first data processing unit and a second data processing unit, of the type wherein a secure communication channel between the first data processing unit and the second data processing unit is established in a communication configuration step, and wherein a first message is transmitted from the second data processing unit to the first data processing unit via the secure communication channel in a data transmission step. The invention also pertains to an arrangement suitable for implementing such a method.

2. Description of the Prior Art

In numerous services performed with the aid of data processing units, the most recent version of the service data required for performing the service needs to be available in the data processing unit at all times. For example, the most recent rate tables need to be utilized when calculating the postage for a letter to be metered with a postage metering machine because the correct postage for the respective item to be mailed and consequently an unproblematic transport thereof can only be ensured in this fashion. To a certain degree, this also applies to other services in which the fee to be paid or other data required for performing the service is determined based on such service data.

The most recent version of the service data is usually made available by the provider of the service or a third party. The service data are frequently stored in and available for downloading from a second data processing unit that usually is a data center. During the download, the service data is transmitted via a communications link in a data network or the like, to which both data processing units are connected. In this context, it needs to be ensured that service data, in particular, billing or security data, are not corrupted during the transmission. This is usually achieved by utilizing cryptographic means.

In this context, U.S. Pat. No. 5,448,641 discloses transmitting the rate tables for postage metering machines together with a digital signature that is generated from the fee table to be utilized. When generating the digital signature, the fee table or a predetermined part of the fee table is subjected to a so-called hash algorithm, for example, the Secure Hash Algorithm (SHA) in a data center. A so-called message digest is generated with this algorithm. This message digest is then encrypted using a secret key. The message digest encrypted this way then forms the digital signature.

In order to check in the postage-metering machine whether or not the rate table was manipulated during its transmission, the digital signature is decrypted in order to obtain the message digest. In addition, a new message digest is calculated from the transmitted rate table or the predetermined part of the rate table with the same hash algorithm, and it is checked whether the new message digest matches the message digest obtained from the digital signature. When utilizing such a hash algorithm, a very slight change of the input data already causes a significant deviation in the result of the calculation. Consequently, it has to be assumed that no manipulation has occurred and that the rate table can be utilized as intended if both message digests match.

This method provides a comparatively high security because manipulations of the service data, i.e., the rate tables, during the transmission cannot remain undetected. However, this method has the disadvantage that it is relatively complicated. First, the corresponding hash algorithm needs to be available in the postage-metering machine. Second, the integrity check requires a comparatively high computing expenditure because the signature needs to be decrypted and a new message digest needs to be generated in order to carry out the comparison.

With respect to the updating of rate tables in postage metering machines, European Application 0 969 420 discloses utilizing a so-called MAC (Message Authentication Code) for checking the integrity of the rate table transmitted by a data center. In this case, a checksum is initially generated in the postage-metering machine from the rate table with the aid of a predetermined checksum algorithm. This checksum is then encrypted with a secret key in order to obtain the MAC. This MAC is transmitted back to the data center. The data center initially generates a new checksum from the previously transmitted rate table with the same checksum algorithm. The new checksum is then encrypted with a secret key in order to obtain a new MAC'. If this new MAC' matches the MAC transmitted by the postage metering machine, it is assumed that the transmission took place without manipulations and a corresponding message is transmitted to the postage metering machine that subsequently acknowledges the rate table.

This version is also relatively complicated because a corresponding checksum algorithm needs to be available in both data processing units. In addition, a series of communication steps is required in order to complete the updating of the service data, wherein various manipulations are possible during these communication steps such that corresponding countermeasures need to be provided.

An object of the present invention is to provide a method and an arrangement of the initially described type, which entirely or at least partially eliminate the aforementioned disadvantages and, in particular, ensure a simple, reliable and secure data exchange.

SUMMARY OF THE INVENTION

The above object is achieved in accordance with the invention in a method and arrangement for securely exchanging data between a first data processing unit and a second data processing unit, wherein a secure communication channel is established between the first data processing unit and the second data processing unit in a communication configuration step, and a first message is transmitted from the second data processing unit to the first data processing unit via the secure communication channel in a data transmission step, and wherein during the data transmission step, the second data processing unit generates a second message by appending a predetermined annex to the first message and a third message by encrypting the second message using a secret key that is available only in the first data processing unit and in the second data processing unit and then transmits the third message to the first data processing unit.

The present invention is based on the insight that a simple, reliable and secure data exchange can be ensured if a second message is initially generated in the second data processing unit during the data transmission step, namely by appending a predetermined annex to the first message. Subsequently, a third message is generated by encrypting the second message using a secret key that is present only in the first data processing unit and in the second data processing unit. The third message is finally transmitted to the first data processing unit.

The encryption of the second message using the secret key ensures that the data cannot be manipulated during their transmission. The annex to the first message provides another simple option for detecting possible manipulations, namely without requiring complicated check algorithms.

The method may be configured such that the first message is also transmitted to the first data processing unit in addition to the third message. However, it is preferred to transmit only the third message to the first data processing unit because the third message contains the first message in any event. This first message can be obtained by means of a simple decryption process and an equally simple isolation from the third message.

In the method according to the invention, only simple encryption and decryption processes, as well as a simple comparison of the data obtained this way, need to be carried out in the first data processing unit during the subsequent integrity check.

In instances in which the first message is transmitted together with the third message, the integrity check can be initiated by initially appending the predetermined annex to the first message in the first data processing unit in order to generate a new second message. This new second message is then encrypted with the secret key in order to generate a new third message. If this new third message matches the transmitted third message, it is assumed that no manipulation has occurred during the transmission.

In a decryption step, the third message preferably is decrypted in the first data processing unit by utilizing the secret key, and the second message is checked with respect to its integrity in an ensuing integrity check step. In instances in which the first message is transmitted together with the third message, the predetermined annex may be initially appended to the first message in order to generate a new second message. If this new second message matches the second message generated by decrypting the transmitted third message, it is assumed that no manipulation has occurred during the transmission.

In a preferred embodiment of the method according to the invention, in which the data volume to be transmitted and processed during the integrity check is comparatively low, the integrity check is realized by isolating the annex from the second message during the integrity check step and subsequently checking whether or not the annex matches a predetermined annex. In this case, it is particularly advantageous that the first message is not transmitted together with the third message.

The annex may be, in principle, an arbitrarily configured annex that is present in both data processing units. In order to improve the security, this annex preferably is occasionally changed, for example, within fixed intervals or randomly determined intervals. The respective data quantities to be stored in the data processing units can be maintained low if the annex consists of at least a part of the secret key. The respective part of the secret key can be predetermined, wherein this part may also be occasionally changed. It would also be conceivable to change the predetermined part of the key after a fixed or randomly determined number of data exchanges or, in particular, with each data exchange.

The secret key may be, in principle, any key that is suitable for such cryptographic applications. It is merely required to protect the key in both data processing units accordingly so as to ensure a sufficient degree of security. Detailed explanations in this respect are not provided because numerous methods for securing cryptographic codes in data processing units are known.

In a further preferred embodiment of the method according to the invention, security is improved due to the fact that the secret key consists of a secret session key that is generated during the communication configuration step. This significantly limits the manipulation options because the secret key is not known before the communications link is established and consequently cannot be corrupted beforehand.

The secret key may be generated, in principle, arbitrarily in accordance with any suitable method for generating cryptographic keys of this type. The generation of the secret key is preferably realized by generating a first partial key in the first data processing unit and transmitting this first partial key to the second data processing unit. In addition, a second partial key is generated in the second data processing unit and transmitted to the first data processing unit. The secret key finally is generated in the first data processing unit and in the second data processing unit from the first partial key and the second partial key in accordance with a predetermined code-generating scheme. This method has the advantage that the secret key never has to be exchanged between the two data processing units in its entirety. This additionally complicates the access to the secret keys.

The code-generating scheme may be any predetermined algorithm. In particularly simple variations, the secret key is composed from the first partial key and the second partial key.

The secret key can be used permanently once it has been generated, however, the secret key preferably is a temporary key that is used only for a certain period of time and changed within certain intervals as described above.

In another embodiment of the method according to the invention, the result of the integrity check is transmitted back to the second data processing unit. A corresponding confirmation step is provided for this purpose. If the integrity of the second message is detected in the integrity check step, a positive confirmation message is transmitted from the first data processing unit to the second data processing unit. This confirmation message may also contain the first message in order to enable the second data processing unit to carry out another integrity check.

If the integrity of the second message is not detected during the integrity check step, a negative confirmation message is transmitted alternatively or additionally from the first data processing unit to the second data processing unit. An error mode may also be provided for such instances. For example, this error mode causes the second data processing unit to repeat the preceding steps, in particular, to retransmit the previously transmitted data, in order to achieve an error-free transmission of the first message. If the second data processing unit does not receive a positive confirmation message after a predetermined number of attempts, it interrupts the communication with the first data processing unit. It is preferred to record and store all steps of the respective data processing unit for subsequent use in such instances that inevitably lead to the execution of predetermined error routines.

In another preferred embodiment of the method according to the invention, the secure communication channel is closed by the second data processing unit in a communication termination step after the positive confirmation message is received, and the secret key is then destroyed in the first data processing unit and in the second data processing unit. This preferably also applies to the above-described error mode after a predetermined number of failed attempts.

In another embodiment of the method according to the invention the first data processing unit is formed by a first processing module and a security module that is connected to the processing module, and the decryption step is carried out by the security module. This makes it possible to execute security-relevant processes in a correspondingly limited and secure environment that can also be controlled more easily.

This is the reason why the integrity check step and, additionally or alternatively, the confirmation step is/are also carried out by the security module.

If the integrity of the second message is detected, the processing module preferably stores at least a part of the first message for further use, namely in a memory that is connected to the processing module. If the integrity of the second message is not detected, the processing module alternatively or additionally switches the security module into an error mode. In this error mode, the corresponding device may be respectively locked for further use. It would also be conceivable to generate a corresponding error message or a corresponding error signal in order to inform the user of the first data processing unit of the error. It is also possible to automatically transmit a corresponding error message to the second data processing unit or to other devices of third parties. In the case of a postage-metering machine, this may pertain, for example, to the manufacturer's data center or the data center of the respective mail carrier.

In a further embodiment of the method according to the invention, the first message information and a digital signature by the second data processing unit on the first information. If stored in the first data processing unit, such a digital signature not only makes it possible to additionally secure the data to be transmitted, but also to check the integrity of the data used by the first data processing unit after the integrity check step that is carried out immediately after the data transmission.

In this respect, it is proposed that the integrity check step is at least partially repeated at predetermined times. This may be the case, for example, after a certain time of utilization of the first data processing unit, after a certain number of utilizations of the first data processing unit or after the first data processing unit has been switched on a certain number of times, in particular, each time the first data processing unit is switched on.

The digital signature can be arbitrarily generated with the aid of sufficiently known signature algorithms and verified in the integrity check step. In this context, it is possible to utilize signature algorithms with message recovery which reconstruct the message, based on which the signature was generated, during the signature verification and compare the reconstructed message with the transmitted message. One example of such a signature algorithm with message recovery is the RSA signature algorithm. In the light of the required computing expenditure, it is preferred, however, to utilize signature algorithms without message recovery, in which no reconstruction of the message that forms the basis of the signature takes place during the course of the signature verification. Examples of such signature algorithms without message recovery are ElGamal and its variations (for example, Schnorr signatures), DSA, Gost, ECDSA, ESIGN and GMR. Even if they are used in connection with the initially described known methods, signature algorithms without message recovery not only reduce the computing expenditure, but also make it possible to additionally increase the security because the message that forms the basis of the signature cannot be reconstructed.

The present invention also pertains to an arrangement for securely exchanging data which includes a first data processing unit and a second data processing unit that are designed for establishing a secure communication channel and for transmitting a first message from the second data processing unit to the first data processing unit via the secure communication channel. According to the invention, a secret key is provided and only stored in the first data processing unit and in the second data processing unit. The second data processing unit is designed for generating a second message by appending a predetermined annex to the first message. It is also designed for generating a third message by encrypting the second message using the secret key, as well as for transmitting the third message to the first data processing unit via the secure communication channel.

The arrangement according to the invention is suitable for implementing the method according to the invention. This arrangement makes it possible to realize the same advantages and functions as those described above with reference to the method according to the invention.

The functions described above with reference to the method according to the invention can be realized arbitrarily. Depending on the complexity of the function, it would be possible, for example, to utilize application-specific integrated circuits (ASICs) or software solutions, in which the function is made available by a processor that accesses corresponding programs and data that are stored in a memory connected to the processor.

The first data processing unit preferably is designed for decrypting the third message by utilizing the secret key and for carrying out an integrity check of the second message. In order to enable the first data processing unit to carry out the above-described integrity check, it is preferably designed for isolating the annex from the second message and for comparing the annex with a predetermined annex.

As mentioned above, the secret key preferably is a secret session key that is used, in particular, only for a current session and is destroyed after the session is completed. The session key can be generated in the first data processing unit as well as in the second data processing unit, with the data processing units being respectively designed for generating the secret key and for transmitting the generated session key to the other data processing unit. For example, a corresponding key generating algorithm is stored in and accessed by the respective data processing unit.

The secret session key is preferably generated by utilizing both data processing units, namely such that the key is not exchanged between both data processing units in its entirety. In this case, the first data processing unit is designed for generating a first partial key and for transmitting the first partial key to the second data processing unit. The second data processing unit is designed for generating a second partial key and for transmitting the second partial key to the first data processing unit. In addition, a corresponding key generating scheme, according to which the respective data processing units generate the secret key from the first partial key and the second partial key, is provided in both data processing units.

As mentioned above, the first data processing unit is designed for carrying out the integrity check. The first data processing unit preferably is also designed for transmitting a positive confirmation message to the second data processing unit when the integrity of the second message is detected. Additionally or alternatively, it is designed for transmitting a negative confirmation message to the second data processing unit when the integrity of the second message is not detected. In addition, the second data processing unit preferably is designed such that it closes the secure communication channel at least after receipt of the positive confirmation message. Once the communication channel is closed, the first data processing unit and the second data processing unit respectively destroy the secret session key.

The arrangement according to the invention is structured arbitrarily. The above-described functions of the method according to the invention can be realized in an arbitrary fashion with correspondingly configured application-specific hardware or standard components and application-specific software. The first data processing unit preferably contains a first processing module and a security module that is connected to the first processing module and designed for decoding at least the third message. The security module preferably is also designed for carrying out the integrity check and, additionally or alternatively, for transmitting a confirmation message in dependence on the result of the integrity check.

In a preferred embodiment of the arrangement according to the invention, the processing module is designed for storing at least a part of the first message if the integrity of the second message is detected. In this case, the first message is stored for further processing in a memory that is connected to the processing module. If the integrity of the second message is not detected, the processing module and, additionally or alternatively, the security module is/are switched into the initially mentioned error mode.

In a further embodiment of the arrangement according to the invention, the second data processing unit is designed for generating a first digital signature on first information and for generating the first message from the first information and the first digital signature. As mentioned above, this makes it possible to also check the integrity of the data used at a later time. The first data processing unit is designed for at least partially repeating the integrity check at predetermined times in this case.

The invention can be utilized in connection with any application in which transmission of data from a first data processing unit to a second data processing unit in a secure fashion is necessary. The invention is suitable for use in connection with any service that is performed with the aid of data processing units and in which the most recent version of the service data required for performing the service always needs to be available in the first data processing unit.

In view of the small data volume to be transmitted, the invention can be utilized in a particularly advantageous fashion in constellations in which a central second data processing unit, for example, a remote data center, needs to supply several first data processing units with corresponding service data. Postage metering machines represent one particularly advantageous application of the invention. Consequently, the first data processing unit preferably consists of a postage-metering machine.

The present invention also pertains to a data processing unit with the characteristics of the above-described first data processing unit or the above-described second data processing unit of the arrangement according to the invention.

DESCRIPTION OF THE PREFERRED EMBODIMENTS

Figure 1:
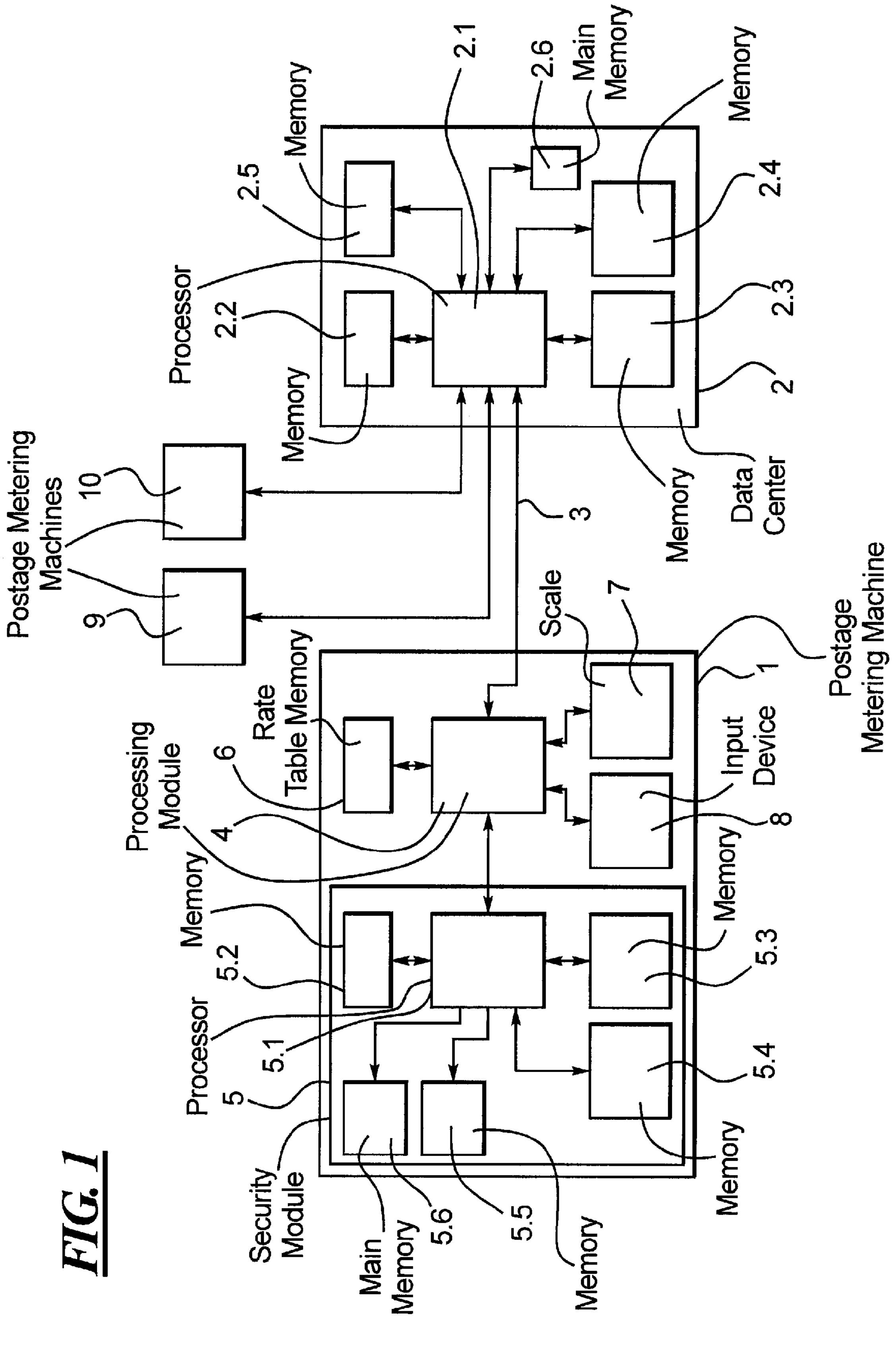
FIG. 1 is a schematic block diagram of a preferred embodiment of the arrangement according to the invention for carrying out the method according to the invention.

FIG. 1 is a schematic block diagram of a preferred embodiment of the arrangement according to the invention for carrying out the method according to the invention. The arrangement includes a first data processing unit in the form of a postage metering machine 1 and a second data processing unit in the form of a remote data center 2 that can be connected to the postage metering machine 1 in order to exchange data via a communications link 3 that is established with the aid of communication means (that are not illustrated in order to provide a better overview). The postage-metering machine 1 comprises a processing module 4 and a security module 5 that is connected to the processing module 4 and that controls security-relevant processes in the postage-metering machine 1.

A first message needs to be transmitted from the data center 2 to the postage-metering machine 1 during the course of a data exchange. This first message contains first information in the form of a rate table that is used by the postage-metering machine 1 in order to calculate the postage required for mailing a certain item with a mail carrier. If the rate table is not corrupted during the transmission, it is stored in a rate table memory 6 that is connected to the processing module 4. The processing module 4 then calculates the required postage for a certain item in dependence on its weight and data that is input by the user and pertains to the shipping method, etc. The weight of the item is determined with a scale 7 that is connected to the processing module 4. The user enters data via an input device 8 that is also connected to the processing module 4.

According to FIG. 1, additional postage metering machines 9 and 10 that are realized analogously to the postage-metering machine 1 also can be connected to the data center 2.

In order to prevent the mail carrier from rejecting an item to be mailed due to an insufficient postage or, alternatively, the overpayment of postage by the recipient, as well as to prevent the item from being metered with an excessively high postage, an uncorrupted version of the most recent rate table of the mail carrier always needs to be available in the postage metering machine 1. In this respect, it is particularly important for the user of the postage-metering machine 1 that the rate table is not subjected to any manipulations by third parties during its transmission.

The data center 2 initiates the transmission of the rate table by establishing a connection with the postage-metering machine 1 as soon as a new version of the rate table is available in the data center 2. However, it would also be conceivable for the transmission of the new rate table to take place as soon as the postage-metering machine 1 contacts the data center 2.

The individual steps of the method according to the invention, which are carried out with the arrangement according to the invention shown in FIG. 1, are described below with reference to FIGS. 1 and 2.

In order to ensure an uncorrupted transmission of the first message with the rate table, a secure communication channel is initially established between the postage-metering machine 1 and the data center 2 via the communications link 3 in a communication configuration step 20. The secure communication channel is conventionally established in the form of a mutual authentication between the security module 5 and the data center 2 via the processing module 4, namely by utilizing cryptographic means.

In the described embodiment, a system of public and secret keys is used for the mutual authentication. This system is sufficiently known and consequently not described in greater detail. In this respect, it should merely be noted that the first processor 5.1 of the security module 5 accesses a first memory 5.2 during the mutual authentication, wherein this first memory not only contains the required encryption and verification algorithms, as well as the public key and the secret key of the security module 5, but also the public key of the data center 2, as well as corresponding certificates. In the data center 2, the second processor 2.1 accesses a second memory 2.2 that not only contains the required encryption and verification algorithms, as well as the public key and the secret key of the data center 2, but also the public key of the security module 5, as well as corresponding certificates.

Once the secure communication channel is successfully established, a secret key in the form of a secret session key is generated in the postage metering machine 1 and in the data center 2 in a key generating step 21, wherein this secret session key is only available in the postage metering machine 1 and in the data center 2.

Figure 2:
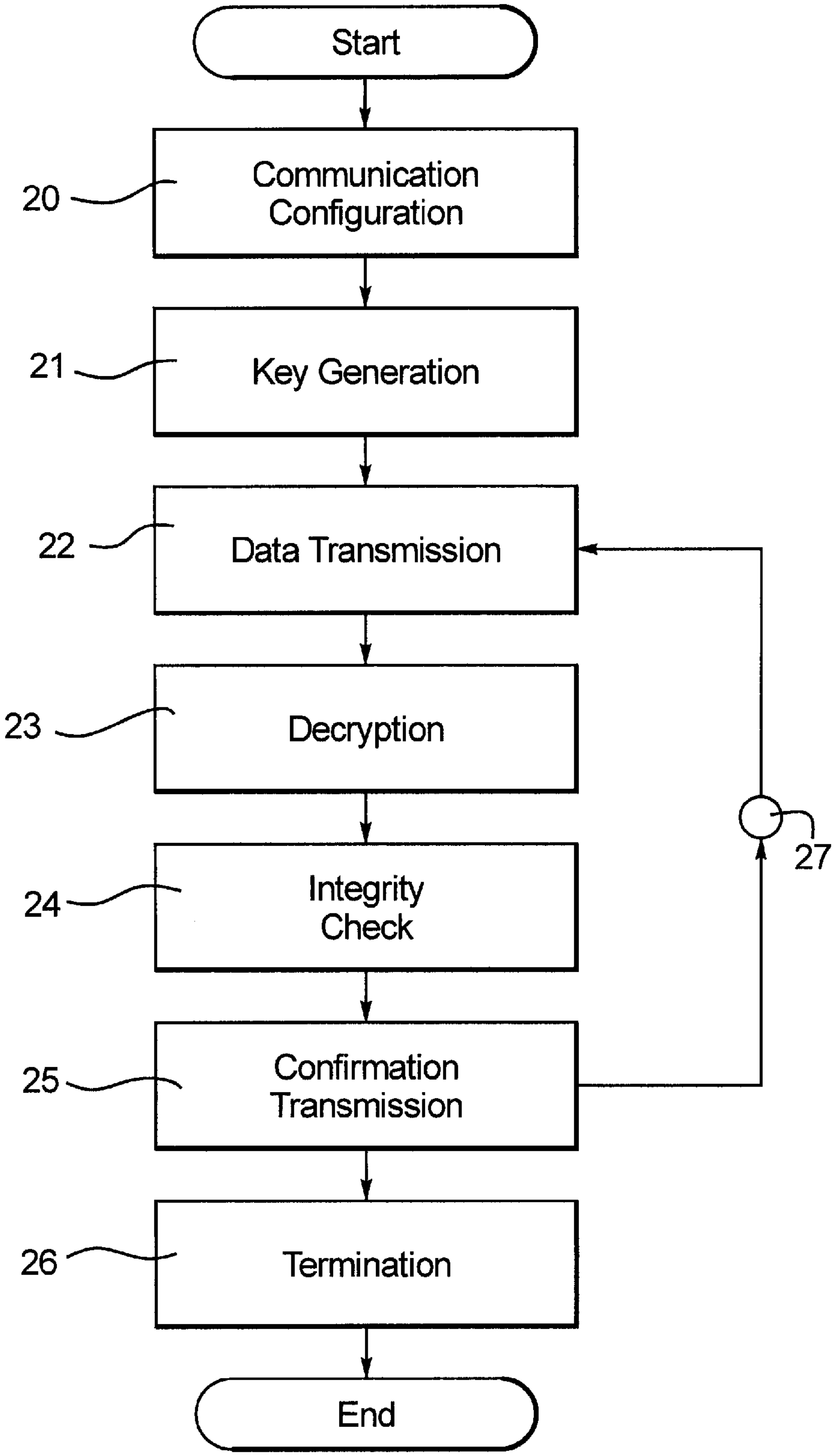
FIG. 2 is a schematic flow chart of the method according to the invention being carried out with the arrangement shown in FIG. 1.
Figure 2A:
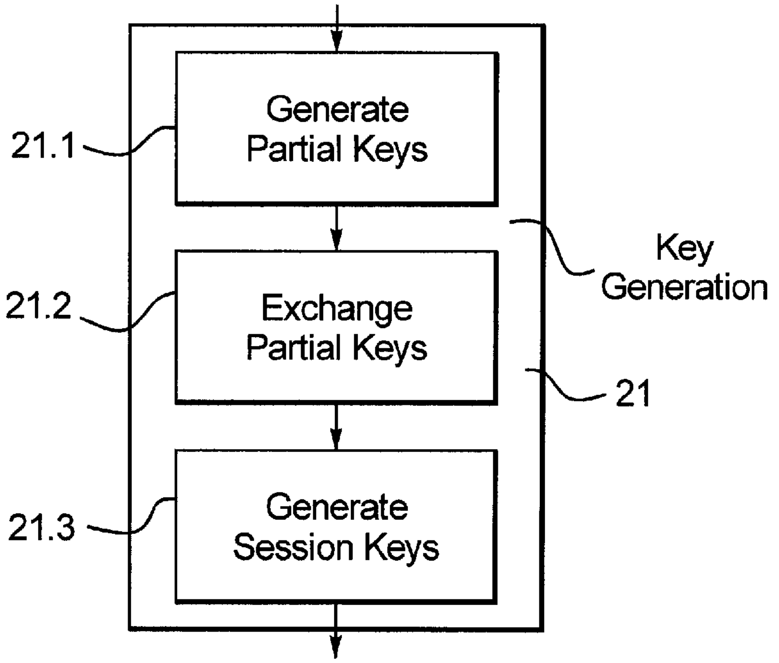
FIG. 2A shows a first detail of the flow chart shown in FIG. 2.

According to FIG. 2A, the key generating step 21 begins with a partial step 21.1, in which a first partial key is generated in the first processor 5.1 and a second partial key is generated in the second processor 2.1. For this purpose, the first processor 5.1 accesses the third memory 5.3 that contains a corresponding key generating algorithm. The second processor 2.1 accesses a fourth memory 2.3 that also contains a corresponding key generating algorithm. It is understood that the partial keys may already be generated before the secure communication channel is established in other variations of the invention.

The two partial keys are then exchanged via the secure communication channel in a partial step 21.2, wherein the first partial key is transmitted to the second processor 2.1 and the second partial key is transmitted to the first processor 5.1.

In a partial step 21.3, the secret session key is generated from the two partial keys in the postage metering machine 1 and in the data center 2 in accordance with a predetermined key generating scheme, with the classified session key being stored in the third memory 5.3 of the security module 5 and in the fourth memory 2.3 of the data center 2, respectively.

The key-generating scheme is also stored in the third memory 5.3 of the security module 5 and in the fourth memory 2.3 of the data center 2, respectively. In the described embodiment, the key generating scheme merely consists of appending the second partial key to the first partial key. In other variations of the invention, the secret session key naturally may also be generated from the first and the second partial keys in accordance with other schemes.

According to FIG. 2, the key-generating step 21 is followed by a data transmission step 22, in which the rate table is transmitted from the data center 2 to the postage-metering machine 1 via the secure communication channel.

Figure 2B:
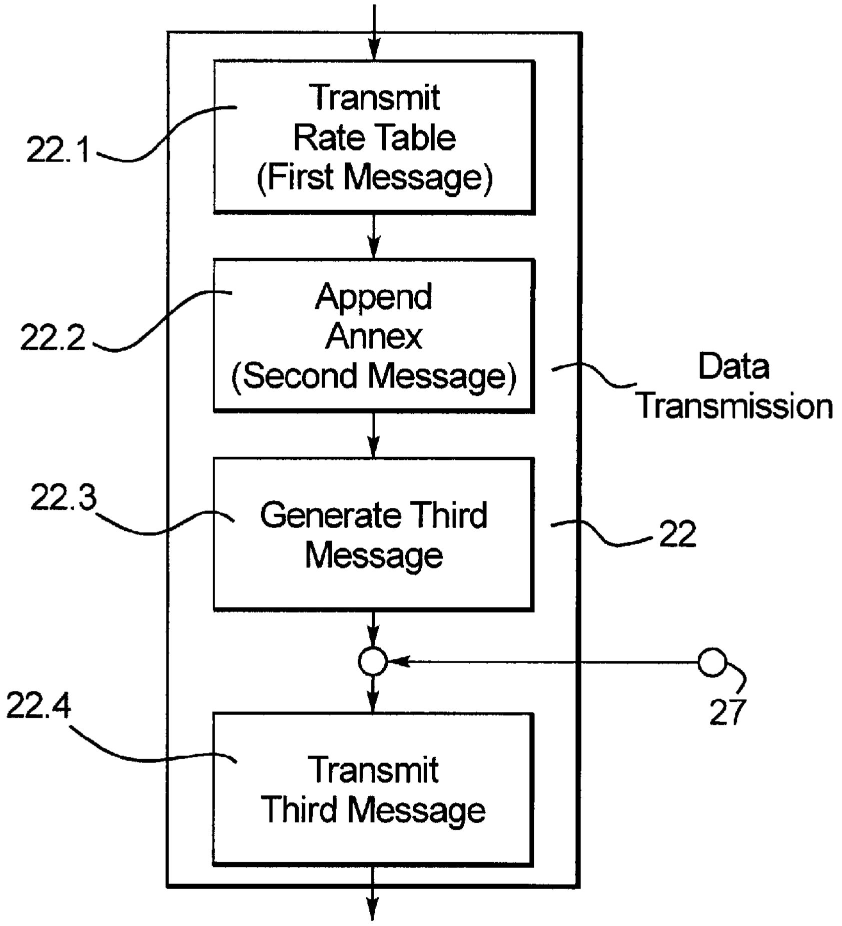
FIG. 2B shows a second detail of the flow chart shown in FIG. 2.

According to FIG. 2B, a first message that contains first information in the form of the rate table to be transmitted is initially generated in the data center 2 by the second processor 2.1 in a partial step 22.1.

In the described example, the first message also contains a first digital signature that is conventionally generated on the first information, i.e., the rate table, by the second processor 2.1 that accesses the second memory 2.2 for this purpose. A digital signature algorithm without message recovery is utilized in this case. However, such a digital signature on the first information may also be omitted in other variations of the invention.

A second message is generated from the first message in the data center 2 in a partial step 22.2, namely by appending an annex to the first message with the aid of the second processor 2.1. In the described example, the annex consists of the secret session key stored in the fourth memory 2.3.

A third message is generated from the second message in the data center 2 in a partial step 22.3, namely by encrypting the second message using the secret session key with the aid of the second processor 2.1. For this purpose, the second processor 2.1 utilizes a corresponding encoding algorithm that is stored in a fifth memory 2.4 of the data center 2.

The third message is subsequently transmitted from the data center 2 to the postage-metering machine 1 via the secure communication channel in a partial step 22.4.

As mentioned above, the annex is formed by the secret session key in the described example. Naturally, any other annex may be utilized in other variations of the invention. The annex may also consist of a predetermined part of the secret session key. The part of the secret session key in question may be specified or agreed upon between the postage metering machine and the data center, for example, during the course of a communication, in particular, via the secure communication channel. This specification may also take place simultaneously with or after the transmission of the third message.

FIG. 2 also shows that the third message is decrypted in the security module 5 of the postage-metering machine 1 in a decryption step 23 in order to obtain the second message in the security module 5. For this purpose, the first processor 5.1 of the security module accesses the third memory 5.3 that contains the secret session key and a sixth memory 5.4 that contains a corresponding decryption algorithm.

According to FIG. 2, an integrity check is subsequently carried out in the security module 5 of the postage-metering machine 1 in an integrity check step 24, in which the integrity of the second message is checked. For this purpose, the first processor 5.1 utilizes an integrity check algorithm that is stored in a seventh memory 5.5 of the security module 5. Depending on the result of the integrity checks, a corresponding confirmation message is transmitted from the postage-metering machine 1 to the data center 2 in a confirmation step 25.

Figure 2C:
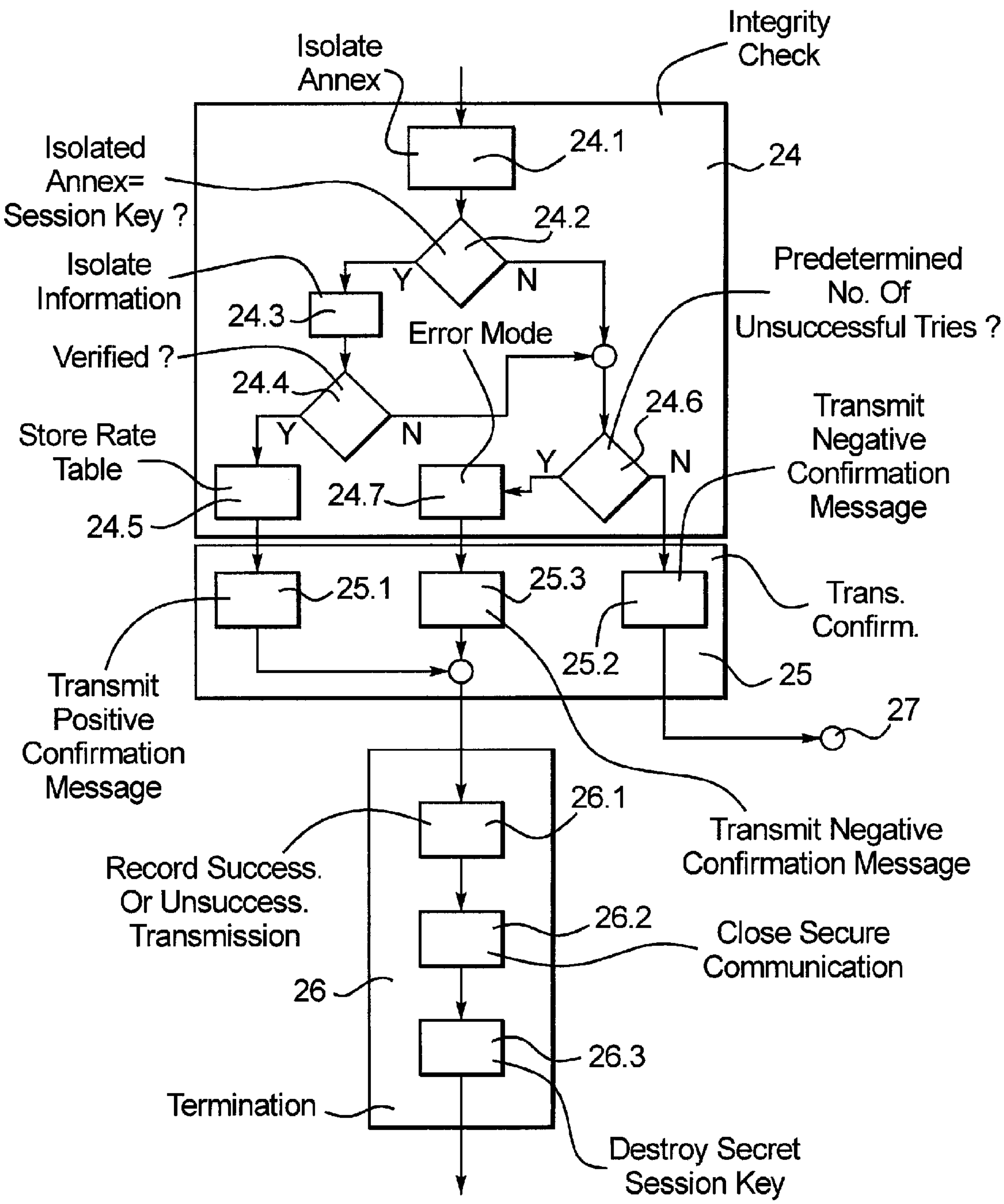
FIG. 2C shows a third detail of the flow chart shown in FIG. 2.

According to FIG. 2C, the first processor 5.1 initially isolates the annex as well as the first message from the second message during the integrity check step 24, namely in a partial step 24.1. In the described embodiment, the first processor 5.1 removes a bit sequence of predetermined position and length from the second message for this purpose.

In a partial step 24.2, the annex that was isolated from the second message is compared with a predetermined annex, i.e., with the secret session key stored in the third memory 5.3, with the aid of the first processor 5.1.

If it is determined in the partial step 24.2 that the result of the check is positive, i.e., that the isolated annex matches the predetermined annex, the first information, i.e., the rate table, and the first digital signature are isolated from the first message in a partial step 24.3. For this purpose, the first processor 5.1 once again removes corresponding bit sequences of predetermined position and length from the first message.

The first digital signature is then verified in a partial step 24.4. For this purpose, the first processor 5.1 not only utilizes the first information and the first digital signature, but also a corresponding verification algorithm without message recovery, as well as the public key of the data center 2, both of which are stored in the first memory 5.2. It goes without saying that the partial steps 24.3 and 24.4 can also be omitted in variations of the invention in which no first digital signature is utilized.

If it is determined that the result of the verification is also positive in the partial step 24.4, i.e., that the first digital signature matches the first information, the integrity check is successfully completed. The rate table is then stored in the rate table memory 6 by the processing module 4 under the control of the security module in partial step 24.5, and an old rate table stored in the rate table memory, if applicable, is overwritten.

Once the integrity check is successfully completed, i.e., once the integrity of the second message is detected, a positive confirmation message is transmitted from the security module 5 of the postage metering machine 1 to the data center 2 during the confirmation step, namely in a partial step 25.1.

Once the positive confirmation message is received, the data center 2 terminates the connection with the postage-metering machine 1 in a termination step 26 as shown in FIG. 2.

According to FIG. 2C, the data center 2 initially records the successful completion of the rate table transmission in a partial step 26.1, namely in an eighth memory 2.5 that is connected to the second processor 2.1.

The data center 2 then closes the secure communication channel and the communication link with the postage-metering machine 1 is interrupted in a partial step 26.2.

Subsequently, the secret session key is destroyed in the data center 2 in a partial step 26.3, namely by overwriting the corresponding storage area of the fourth memory 2.3 with the aid of the second processor 2.1. The same process also takes place in the postage-metering machine 1 once it is determined that the communication with the data center was interrupted. This means that the secret session key is also destroyed in the security module 5 in partial step 26.3 by overwriting the corresponding storage area of the third memory 5.3 with the aid of the first processor 5.1. This concludes the steps of the method according to the invention.

If the result of the check carried out in partial step 24.2 according to FIG. 2C is negative, i.e., if the isolated annex does not match the predetermined annex, the security module 5 initially checks in a partial step 24.6 whether a predetermined number of unsuccessful data transmission steps 22 have been carried out. This is also the case if the result of the verification carried out in partial step 24.4 of the integrity check step 24 is negative.

If the predetermined number of unsuccessful data transmission steps 22 is not yet reached, a first negative confirmation message is transmitted from the security module 5 to the data center 2 in a partial step 25.2 of the confirmation step 25. The partial step 22.4 of the data transmission step 24 is repeated once the first negative confirmation message is received, i.e., the data center 2 re-transmits the third message. This is indicated in FIGS. 2, 2B and 2C in the form of the branch 27.

If the check carried out in partial step 24.6 of the integrity check step 24 indicates that the predetermined number of unsuccessful data transmission steps 22 has been reached, the security module 5 is switched into an error mode in a partial step 24.7. The postage metering machine 1 is unable to carry out further metering processes in this error mode. The user of the postage-metering machine is accordingly informed with an acoustic signal and/or an optical signal.

In this case, the integrity check was not successfully completed, i.e., the integrity of the second message cannot be confirmed. Consequently, a second negative confirmation message is transmitted from the security module 5 to the data center 2 in a partial step 25.3 of the confirmation step 25. The communication termination step 26 is carried out as described above once the second negative confirmation message is received. However, the unsuccessful completion of the rate table transmission is recorded in an eighth memory 2.5 in a partial step 26.1.

In the arrangement according to FIG. 1, the first digital signature that was stored in the rate table memory 6 together with the rate table is not only checked within regular intervals, but also each time the postage metering machine 1 is switched on. For this purpose, the above-described partial step 24.4 of the integrity check step 24 is repeated in order to verify the first digital signature. If the result of the verification carried out in partial step 24.4 is positive, i.e., if the first digital signature matches the first information, the postage-metering machine 1 is allowed to remain operative. However, if the result of the verification carried out in partial step 24.4 is negative, the postage metering machine 1 is switched into an error mode as described above with reference to partial step 24.7 of the integrity check step 24.

During the course of this regular check, the rate table is also checked as to whether a validity date associated with the rate table has expired. If this is the case, the postage-metering machine 1 is also switched into the described error mode.

At this point, it should be noted that the above-described memories do not necessarily have to be separate storage modules. On the contrary, one or more storage modules may be respectively provided, if so required, in the security module 5 and in the data center 2, wherein individual storage modules have different storage areas that form the various memories. For reasons of completeness, it should also be noted that the security module 5 contains a first main memory 5.6 that is connected to the first processor 5.1 and contains all data required for the current step of the method. The data center 2 also contains a second main memory 2.6 that is connected to the second processor 2.1.

The present invention is described above with reference to postage metering machines, but the present invention is equally suitable for other applications, in which the secure transmission of service data between a first data processing unit and a second data processing unit is of importance.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for securely exchanging data between a first data processing unit and a second data processing unit comprising:

establishing a secure communication channel between said first data processing unit and said second data processing unit;

making a first message available at said second data processing unit;

making a same predetermined message annex available at each of said first and second data processing units;

generating a second message in said second data processing unit by appending said predetermined message annex, that is available at said second data processing unit, to said first message, generating a third message in said second data processing unit by encrypting said second message using a secret key that is available only in said first data processing unit and in said second data processing unit;

transmitting said third message to said first data processing unit via said secure communication channel;

decrypting said third message in said first data processing unit utilizing said secret key, and checking said second message as to integrity in an integrity check in said first data processing unit by isolating said annex from said second message and checking whether said annex matches the predetermined annex that is available at said first data processing unit;

generating a positive confirmation message and transmitting said confirmation message from said first data processing unit to said second data processing unit if the integrity of said second message is confirmed in said integrity check; and generating a negative confirmation message and transmitting said negative confirmation message from said first data processing unit to said second data processing unit if the integrity of said second message is not confirmed in said integrity check.

2. A method as claimed in claim 1 comprising additionally and separately transmitting said first message, by itself, from said first data processing unit to said second data processing unit via said secure communication channel.

3. A method as claimed in claim 1 comprising repeating at least a part of said integrity check predetermined times.

4. A method as claimed in claim 1, comprising forming said annex as a part of said secret key, from the group consisting of a predetermined part, a selectable part of said secret key.

5. A method as claimed in claim 1, comprising generating said secret key as a secret session key.

6. A method as claimed in claim 5, comprising generating said secret key by:

generating a first partial key in said first data processing unit and transmitting said first partial key to said second data processing unit;

generating a second partial key in said second data processing unit and transmitting said second partial key to said first data processing unit; and generating said secret key from said first partial key and said second partial key in one of said first data processing unit and said second the processing unit, in accordance with a predetermined key generating algorithm, with said secret key embodying said first partial key and said second partial key.

7. A method according to claim 1, comprising using said secret key as a temporary key for only a certain period of time.

8. A method as claimed in claim 1 comprising generating said positive conformation message as said first message.

9. A method as claimed in claim 1 comprising closing said secure communication channel with said second data processing unit after receipt of said positive confirmation message, and destroying said secret key is destroyed in said first data processing unit and in said second data processing unit.

10. A method as claimed in claim 1 comprising:

forming said first data processing unit from a first processing module and a security module connected to the processing module; and decrypting said third message in said security module in said first data processing unit utilizing said secret key, and checking said second message as to integrity in an integrity check in said first data processing unit.

11. A method as claimed in claim 10, comprising conducting at least one of said integrity check and generation of said confirmation message in said security module.

12. A method as claimed in claim 11, comprising:

said processing module storing at least a part of said first message for further use in a memory connected to said processing module if the integrity of said second message is confirmed; and at least one of said processing module and said security module switching into an error mode if the integrity of said second message is not confirmed.

13. A method as claimed in claim 1, wherein comprising forming said first message from first information and a digital signature by said second data processing unit on said first information.

14. An arrangement for securely exchanging data comprising:

a first data processing unit and a second data processing unit configured to establish a secure communication channel for message transmission between said second data processing unit and said first data processing unit;

each of said first and second data processing units having a memory in which a secret key is stored which is only in said first data processing unit and in said second data processing unit;

said second data processing unit having an information source from which a first message is available and said second data processing unit being configured to generate a second message by appending a predetermined annex to said first message, and to generate a third message by encrypting said second message using said secret key, and being configured to transmit said third message to said first data processing unit via said secure communication channel; and said first data processing unit being configured to decrypt said third message utilizing said secret key and to conduct an integrity check of said second message by isolating said annex from said second message and checking whether said annex matches the predetermined annex that is available at said first data processing unit, generate and transmit a positive confirmation message to said second data processing unit if the integrity of said second message is confirmed, and generate and transmit a negative confirmation message to said second data processing unit if the integrity of said second message is not confirmed.

15. An arrangement according to claim 14 wherein said first processing unit is configured to repeat said integrity check at periodic times.

16. An arrangement according to claim 14, wherein said second data processing unit is configured to form said annex as a part of said secret key, selected from the group consisting of a predetermined part and a selectable part of said secret key.

17. An arrangement according to claim 14, wherein said secret key is a secret session key, and wherein one of said first data processing unit and said second data processing unit is configured to generate said secret key.

18. An arrangement according to claim 17, wherein, for generating said secret key:

said first data processing unit is configured to generate a first partial key and to transmit said first partial key to said second data processing unit;

said second data processing unit is configured to generate a second partial key and to transmit said second partial key to said first data processing unit; and said one of said first data processing unit and said second data processing unit being configured to generate said secret key from said first partial key and said second partial key in accordance with a predetermined key generating algorithm by embodying said first key from said first partial key and said second partial key in said secret key.

19. An arrangement according to claim 14, wherein said first and second data processing units are each configured to employ a temporary key as said secret key, with a limited period of validity.

20. An arrangement according to claim 14, wherein said second data processing unit is configured to close said secure communication channel after receipt of said positive confirmation message, and wherein said first data processing unit and said second data processing unit for destroy said secret key after said secure communication channel is closed.

21. An arrangement according to claim 14, wherein said first data processing unit comprises a first processing module and a security module connected to said first processing module, said security module being configured to decrypt said third message.

22. An arrangement according to claim 21, wherein said security module is configured to conduct said integrity check of said second message.

23. An arrangement according to claim 14 comprising:

a memory connected to said processing module configured to store at least a part of said first message for further use, if the integrity of said second message is confirmed; and at least one of said processing module and said security module being configured to switch into an error mode if the integrity of said second message is not confirmed.

24. An arrangement according to claim 14, wherein said second data processing unit is configured to generate a first digital signature on first information and to generate said first message from said first information and said first digital signature.

25. An arrangement according to claim 14, wherein said first data processing unit is a postage-metering machine.

26. An arrangement according to claim 14 wherein said second data processing unit is a data center remote from said first processing unit.

27. An arrangement as claimed in claim 14 wherein said second data processing unit is configured to additionally and separately transmit said first message by itself from said second data processing unit to said first data processing unit via said secure transmission channel.

* * * * *